Oct. 20, 1925.

H. C. ZAUN

MEAT COOKER

Filed Oct. 10, 1924

H. C. Zaun
INVENTOR

BY *Victor J. Evans*
ATTORNEY

WITNESS:

Oct. 20, 1925.
H. C. ZAUN
1,557,753
MEAT COOKER
Filed Oct. 10, 1924     3 Sheets-Sheet 2
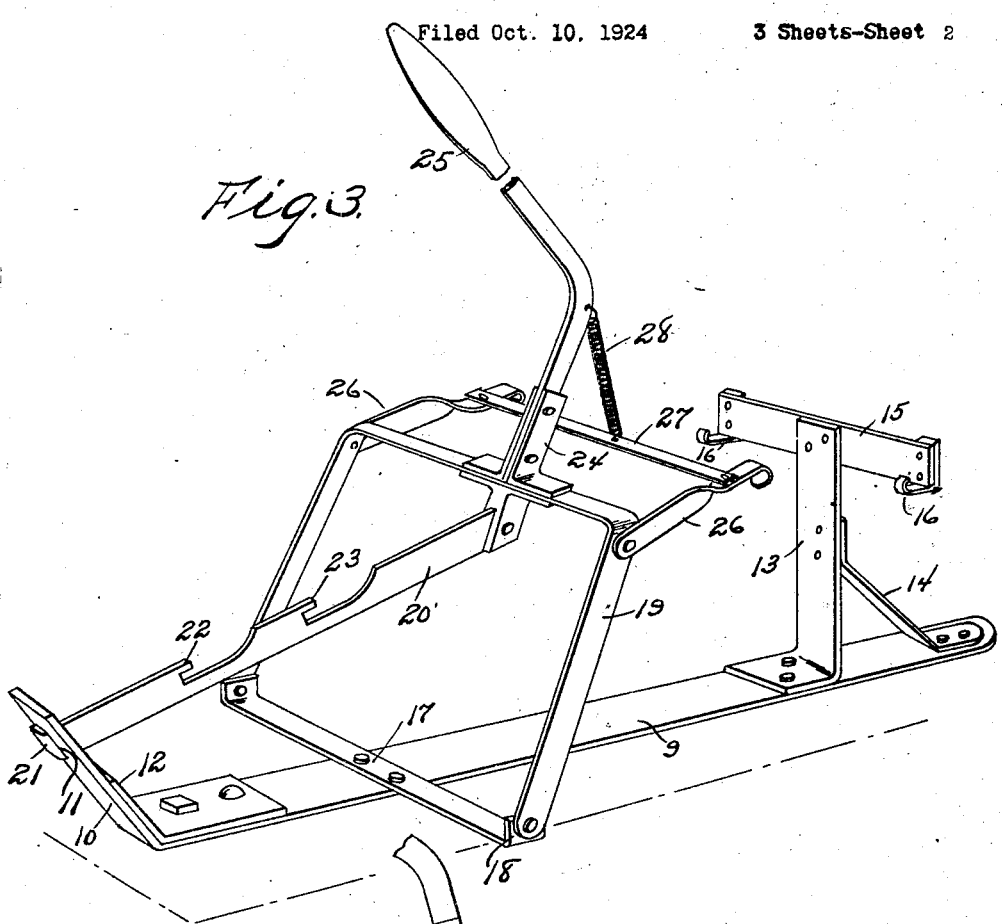
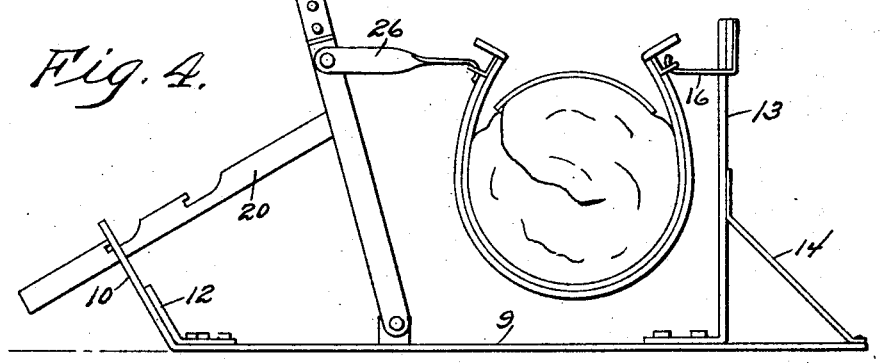
H. C. Zaun
INVENTOR
BY Victor J. Evans
ATTORNEY
WITNESS:

Oct. 20, 1925.  
H. C. ZAUN  
MEAT COOKER  
Filed Oct. 10, 1924

H. C. Zaun
INVENTOR
BY Victor J. Evans
ATTORNEY

WITNESS:

Patented Oct. 20, 1925.

1,557,753

UNITED STATES PATENT OFFICE.

HENRY CARL ZAUN, OF OAKLAND, CALIFORNIA.

MEAT COOKER.

Application filed October 10, 1924. Serial No. 742,855.

*To all whom it may concern:*

Be it known that I, HENRY CARL ZAUN, a citizen of the United States, residing at Oakland, in the county of Alameda and State of California, have invented new and useful Improvements in Meat Cookers, of which the following is a specification.

My present invention has reference to meat cookers and has particular reference to means for cooking boned hams and analogous food products.

An object is the production of a meat cooker whose construction is extremely simple, and which will effectively compress the meat therein so that the same may be cooked without allowing water to penetrate the meat, and whereby the flavor and extracts from the fibrous connecting tissues or gluten will be retained, and whereby the meat after being cooked may be sliced without liability of the particles constituting the same becoming severed one from another.

It is a still further object to produce a ham cooker in the nature of a split spring tube within which the boned ham, after being wrapped is received, means in the nature of a segmental plate being also provided for covering the joint between the edges of the split tube.

A still further object is the provision, in a device of this character of a split spring tube providing a receptacle for the meat to be cooked, said receptacle having reinforcing bands to more positively insure the same assuming a tubular form to compress the meat therein.

The invention further consists in the particular features of construction and in the combination and arrangement of parts hereinafter fully described and illustrated in the accompanying drawings, wherein:—

Figure 3 is a perspective view of the opening jack for the cooker.

Figure 4 is an elevation showing the jack operated to open the cooker when the cooked ham is to be removed therefrom.

Figure 1:
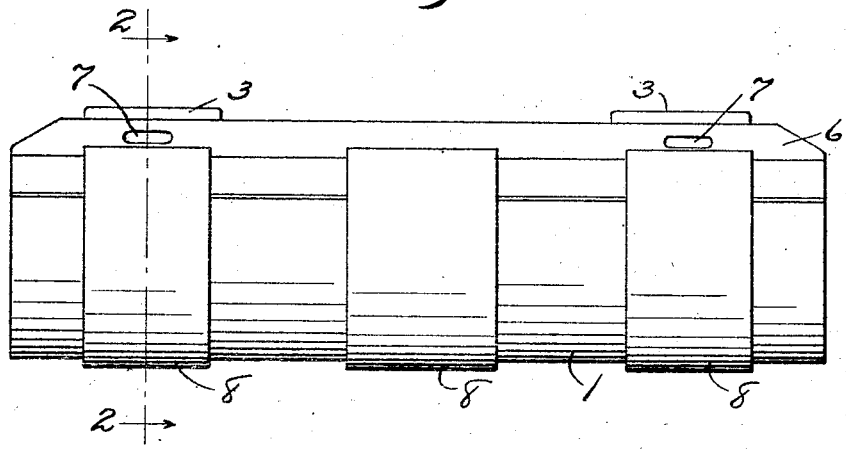
Figure 1 is a side elevation of the cooker in the position when the ham to be cooked is arranged therein.
Figure 2:
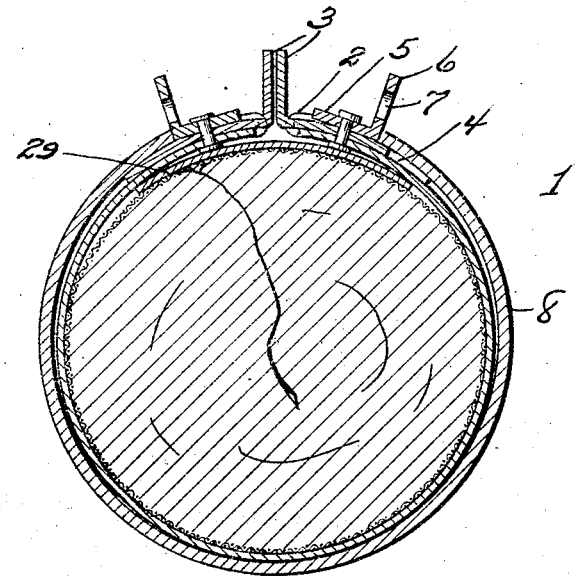
Figure 2 is a sectional view on the line 2—2 of Figure 1.

The cooker broadly indicated by the numeral 1, is in the nature of a split spring tube of comparatively thin metal. The confronting edges of the tube are rounded upon themselves to provide lips 2. These lips, at points adjacent to the ends of the tube are slitted or cut away to provide passages for flanges 3 formed on the edges of segmental reinforcing plates 4 for the cooker 1. The ends of the tubular member are designed to spring toward each other and are limited in such movement by the contact of the oppositely disposed flanges 3 with each other.

Arranged over the segmental plates 4, and riveted thereto as well as to the tube 1 there are the horizontal flanges 5 of angle plates. The vertical flanges 6 of the said plates 5 are provided adjacent to their ends with elongated slots 7.

Surrounding the tubular body of the cooker 1 and having their ends in contacting engagement with the flanges 6 of the angle plates 5 there are spring segmental ring members 8. The ring members are of a greater thickness, and consequently of a greater resiliency than the body of the cooker.

Because of the inherent strength of the cooker as herein described, it is practically impossible for the edges thereof to be manually spread apart for the opening thereof for the insertion or removal of the meat to be cooked and therefore I provide a novel means in the nature of a jack for this purpose, which I will now describe. The jack includes a base plate 9 which is effectively secured on a suitable support. The plate 9, at one of its ends, has an angle upwardly directed extension 10, and the said extension is provided adjacent to its top with a slot 11. The angle extension 10 is preferably reinforced by an angle brace 12. Adjacent to the opposite end of the base 1 there is secured thereon the foot portion of an upstanding plate 13. The plate is reinforced by an angle brace 14 and has secured at its top a laterally extending plate 15. The plate 15 carries at its ends inwardly directed hooks 16.

Centrally secured on the base 9, at a suitable distance from its angle extension 10 there is a laterally extending plate 17 having upturned ends 18. Pivoted to the ends 18 there are the arms of a U-shaped member or yoke 19. Centrally secured to the connecting element of the yoke 19 there is a bracket, and to this bracket there is pivoted a plate 20. The plate 20 passes through the opening 11 in the extension 10 of the base. This end of the plate is off-set, as at 21. The plate 20 has its upper edge provided with two spaced somewhat elongated notches whose inner straight walls terminate in fingers 22 and 23 respectively.

Opposite the bracket to which the rack arm 20 is pivoted there is arranged on the top of the yoke 19 a second bracket 24, and firmly secured to this bracket there is the straight end of an angle lever 25. Pivoted to the sides of the yoke adjacent to the upper corners thereof, there are the body plates of hook members 26, the said hooks being connected together by a plate 27. Connecting the plate 27 with the handle 25 there is a spring 28.

In operation the slots 7 in the flanges 6 of the angle plates 5 on one side of the cooker receive therethrough the hooks 16, the slots in the angle plates on the opposite side of the cooker receiving therethrough the hooks 26. The lever 25 is moved to swing the yoke 19 so that the plate 20 will pass through the slot 11. The spring 28 has a tendency to swing the plate 27 and the hooks 26 toward the lever 25 so that the finger 22 will first contact with the outer face of the angle extension 10 of the base. When in this position the cooked meat may be removed from the cooker. When the handle is further operated to bring the finger 23 into contact with the outer face of the end 10 of the base 9, the cooker is further opened so that the meat may be arranged therein. By moving the plate 20 to bring its fingers out of contacting engagement with the end 10 of the base, the cooker will automatically close.

The ham or other meat product is boned and is wrapped in a cloth before being placed in the cooker. To prevent water in the vessel in which the meat is cooked passing through the opening provided at the confronting ends of the cooker, I arrange in the said cooker a segmental plate 29 which bridges the confronting edges of the said cooker and rests directly on the meat.

With my improvement, a single operation of the jack permits of the opening or closing of the cooker. The construction of the cooker is such that the meat is automatically compressed therein so that the boiling water will not flow therethrough. As a consequence, all of the flavors of the meat are retained and the connecting fibers or gluten are not destroyed. The result is that a better flavored meat product is obtained and the same may be sliced without liability of the fibers thereof breaking.

Figure 5:
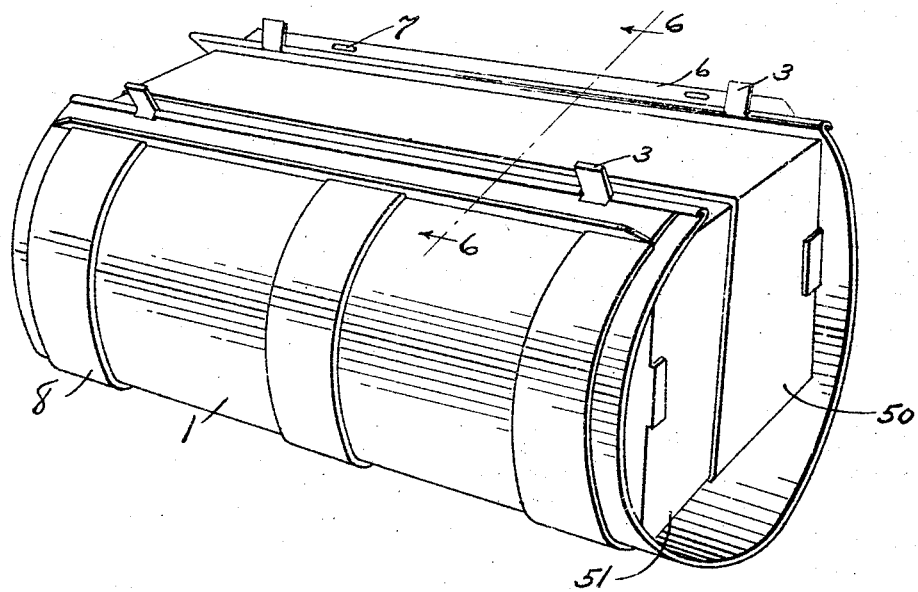
Figure 5 is a perspective view showing the manner in which the squared meat loaves may be cooked.
Figure 6:
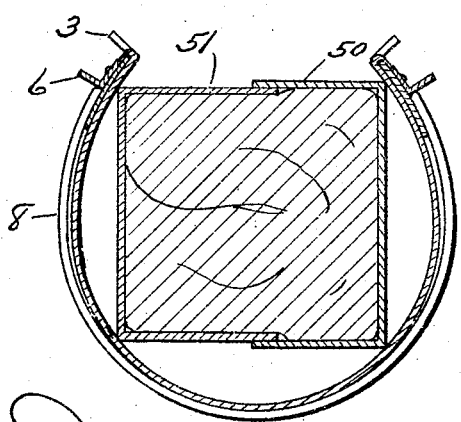
Figure 6 is a transverse sectional view therethrough.

In Figures 5 and 6, I have illustrated the manner in which meat may be cooked to present a square loaf. In this instance, after the spring split member has been spread by the jack, in a manner as previously described, meat is placed in one section of a rectangular box 50 provided with a flanged closure 51 which is telescopically received in the box. When the spring split tube is released from the jack, the latter will force the cover 51 into the box 50, thus compressing the meat in the said box.

It is apparent that two or more boxes, similar to the box 50, and of the same size and proportion may be arranged in the split spring member when the said boxes are set on end and also that a plurality of smaller boxes having telescopic covers may be arranged in the said split member.

Having described the invention, I claim:—

1. A ham cooker, comprising a spring member to receive the ham therein and which is self closing to compress the ham.

2. A meat cooker comprising a split spring tube, reinforcing segments at the meeting edges thereof, outstanding flanges on said segments designed for contacting engagement for limiting the springing of the tube to closed position, a removable segmental plate in the tube below the confronting edges thereof, and longitudinally disposed angle plates secured to the first mentioned segments and to the tube, for the purpose set forth.

3. A meat cooker comprising a split spring tube, reinforcing segments at the meeting edges thereof, outstanding flanges on said segments designed for contacting engagement for limiting the springing of the tube to closed position, a removable segmental plate in the tube below the confronting edges thereof, longitudinally disposed angle plates secured to the first mentioned segments and to the tube, and split spring bands surrounding the tube and contacting the angle plates, for the purpose set forth.

4. In a meat cooker, a spring split tubular member whose edges are normally influenced toward each other, and a box having a flanged cover telescopically received therein and the box designed to be arranged in the split tube, for the purpose set forth.

In testimony whereof I affix my signature.

HENRY CARL ZAUN.